United States Patent [19]

Röss

[11] 4,006,431
[45] Feb. 1, 1977

[54] OPTICAL MOLECULAR AMPLIFIER

[75] Inventor: Dieter Röss, Munich, Germany

[73] Assignee: Siemens Aktiengesellschaft, Munich, Germany

[22] Filed: Oct. 12, 1973

[21] Appl. No.: 405,789

Related U.S. Application Data

[63] Continuation of Ser. No. 315,548, Dec. 15, 1972, abandoned, which is a continuation of Ser. No. 162,707, July 14, 1971, abandoned, which is a continuation of Ser. No. 806,043, March 7, 1969, abandoned, which is a continuation of Ser. No. 329,462, Dec. 10, 1963, abandoned.

[30] Foreign Application Priority Data

Dec. 14, 1962 Germany .............................. 82866

[52] U.S. Cl. ............................................ 331/94.5 P
[51] Int. Cl.² ........................................ H01S 3/092
[58] Field of Search ................................... 331/94.5

[56] References Cited

UNITED STATES PATENTS

| | | | |
|---|---|---|---|
| 3,140,451 | 7/1964 | Fox | 331/94.5 |
| 3,172,056 | 3/1965 | Stitch | 331/94.5 |
| 3,210,688 | 10/1965 | Simpson | 331/94.5 |
| 3,238,470 | 3/1966 | Mooney | 331/94.5 |

FOREIGN PATENTS OR APPLICATIONS 1,299,093   6/1962   France ............................. 331/94.5

Primary Examiner—William L. Sikes
Attorney, Agent, or Firm—Herbert L. Lerner

[57] ABSTRACT

The reflective mirror system of a laser is shaped and arranged relative to the pump source and active material so that the light from the pump source passing by or through the active material is reflected back into the pump source. This is intended to increase the proportion of light absorbed by the active material.

1 Claim, 8 Drawing Figures

OPTICAL MOLECULAR AMPLIFIER

This is a continuation of application Ser. No. 315,548, filed Dec. 15, 1972 and now abandoned, which is a continuation of application Ser. No. 162,707, filed July 14, 1971 and now abandoned, which is a continuation of application Ser. No. 806,043, filed Mar. 7, 1969 and now abandoned, which is a continuation of application Ser. No. 329,462 filed Dec. 10, 1963 and now abandoned.

My invention relates to molecular amplifiers or optical masers for the generation of monochromatic light in the visible and invisible spectral ranges as well as other electromagnetic radiation. In a more particular aspect, the invention concerns energy pumping devices for providing stimulating energy in form of illumination for the optically absorbent, active material of a molecular amplifier, such as a laser, requiring the light from a suitable source, preferably of extremely high brightness density, to be concentrated upon a shaped volume or body of active material by means of a system of reflecting mirrors.

The invention will be described with reference to the accompanying drawings, in which.

Figure 1:
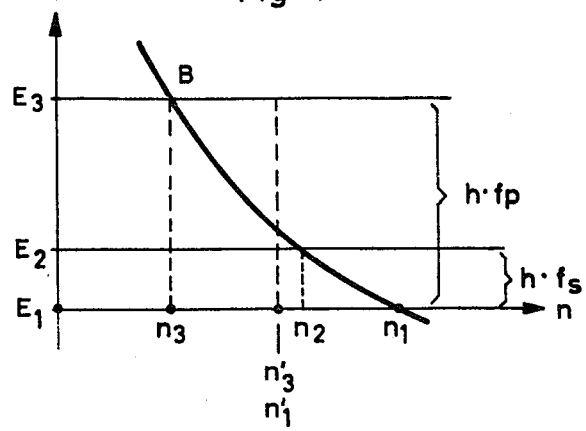
FIG. 1 is an explanatory graph relating to the maser principle involved.

Before dealing with the invention proper, it will be helpful to briefly refer to a simple example concerning the operating principle of molecular amplifiers. For this purpose, FIG. 1 represents the energy distribution for an active maser material, such as a ruby crystal, possessing three energy levels. Indicated on the ordinate is the energy E and on the abscissa the occupancy $n$. The individual energy levels are denoted by $E_1$, $E_2$ and $E_3$. Understood by "occupation" of these energy levels is the number of atoms that possess the energy state indicated by the level. In thermal equilibrium, the higher energy levels are less occupied than the lower levels in accordance with the so-called Boltzmann distribution typified by the curve B in FIG. 1. The intersection of curve B with each individual energy level indicates the occupation numbers for that level. In a solid-state molecular amplifier, this being a molecular amplifier in which the active material consists of a solid body such as ruby calcium fluoride or other crystalline material, the splitting into the individual energy levels can be enforced for example by applying an external magnetic field of corresponding orientation and magnitude. Also applicable are energy levels inherent in the active material itself so that no extraneous auxiliary means are necessary. The enforced energy distribution or the material is so chosen, that the distance between the energy levels $E_1$ and $E_2$ corresponds to the mathematical product $h \cdot f_s$, and the distance between the energy levels $E_1$ and $E_3$ corresponds to the product $h \cdot f_p$, wherein $h$ denotes Planck's quantum number, $f_s$ the signal frequency, and $f_p$ the frequency of a pumping oscillation applied from without.

The amplification in such a three-level molecular amplifier is explained as follows. By means of pumping energy supplied from the outside, the occupation number $n$ in the individual energy levels is changed in such a manner that in energy level $E_3$ the occupation number increases from $n_3$ to $n_3'$. Since the total number of atoms in the active material is constant, this change has the effect that the occupation in level $E_1$ becomes reduced by the same amount. Consequently, the occupation on level $E_1$ decreases from $n_1$ to $n_1'$. Now the larger occupation number $(n_2)$ has been imposed upon the level $E_2$ than obtains for the level $E_1$ now occupied by $n_1'$ atoms. When now are external signal oscillation of the frequency $f_s$ is supplied, the atoms having the energy state $E_2$ pass into the energy state $E_1$. Simultaneously, some transportation of atoms from energy state $E_1$ to the energy state $E_2$ takes place. A transfer from $E_2$ to $E_1$ corresponds to an induced or stimulated emission photons in the active material at the frequency $f_s$, whereas the transfer from $E_1$ to $E_2$ corresponds to an absorption of the induced signal energy. However, due to the occupation of the energy levels $E_1$ and $E_2$ enforced by the pumping energy, the induced emission predominates over the absorption so that in totality more signal energy of the frequency $f_s$ is emitted from the active material than corresponds to the amount of incipient or induced signal energy having the frequency $f_s$.

The three-level system is only one of the possibilities of molecular amplifier operation. There are also systems having, for example, four and more energy levels. These need not be further explained because their operation is analogous. The pumping oscillations generally employed for relatively low signal frequencies are in the range of microwaves. However, it has been found that light, i.e. oscillations in the optical spectrum, can also be employed to advantage as pumping oscillations for the amplification of microwaves. Furthermore, if as in the case of lasers, the signal frequencies are in the range of optical frequencies light-spectrum oscillations are needed as pumping oscillations.

For the purpose of obtaining any appreciable efficiency, with respect to the expenditure in pumping light energy, the illuminating devices used for the above-mentioned purposes have heretofore been designed in such a manner that the light sources are projected by a system of mirrors onto or into the active material, thus forming an optical image of the light source in that material. In most cases, the active material, in the case of solid-state lasers, has the shape of an elongated rod. In a known device, this rod-shaped solid material is surrounded by a helical xenon-lamp, and this illuminating device, as well as the rod-shaped active material, is centrally located in a cylindrical reflector of circular cross section. The efficiency of such a device is rather slight.

Some improvement is obtained if, according to a prior proposal, the pumping source of light and the active material are arranged separate from each other in the respective focal points of an elliptic mirror system so that the pumping light energy issuing from one focal point is concentrated nearly completely in the other focal point or focal line in which the active material, for example the laser material, is located. Due to inevitable image errors, however, not all of the pumping energy is supplied to the active material and, especially in the case of optically thin material, such as weakly doped ruby, only a small portion of the entire pumping light energy is utilized by absorption in the material for the stimulation of laser radiation.

It is an object of my invention to considerably increase the proportion of the light absorbed in the optically absorptive body of active material, relative to the energy emitted by the source of pumping light, thus greatly increasing the efficiency in comparison with the molecular amplifier devices heretofore known.

According to my invention, the reflective mirror system of a molecular amplifier, such as a laser device, generally of the above-described type, is shaped and arranged, relative to the light source and the at least partially light-absorptive body of active material, in such a manner that the light passing by the material, preferably including any light passing through the material, is reflected back into the light source.

It has been found that as a result, a much greater amount of output radiation is obtained under otherwise comparable conditions. This improvement can be explained by the fact that the pumping light coming from the light source is virtually completely reflected in the vicinity of the active material, while avoiding the imaging errors otherwise encountered, and that, furthermore, with an optically thin body of material thus illuminated, the light is repeatedly reflected through the body, some amount of light being absorbed with each penetration. It is particularly advantageous to provide a light source which, with respect to its own light, is optically thin, for example an electric gas discharge lamp, preferably a high-pressure tubular lamp. Investigation based upon the invention has shown that such illuminating devices remain governed by the principle that the energy density at the image location can be at most equal to the energy density in the light source. By virtue of the invention, an increase in energy density within the light source, and consequently also in the body of active material, resulting in an improved utilization of the pumping light, is achieved.

The invention will be further described with reference to the embodiments illustrated by way of example in FIGS. 2 to 8 of the accompanying drawings.

Figure 2:
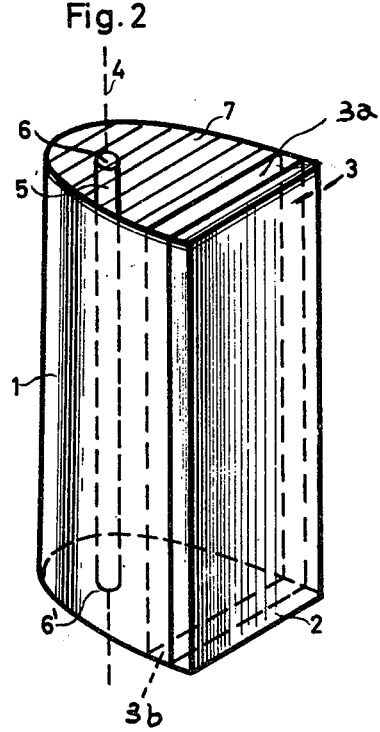
FIG. 2 shows in schematic perspective a laser device according to the invention, having a reflector system whose main portion is shaped as a parabolic cylinder.

Shown in FIG. 2 is a laser device whose reflector system comprises a parabolic cylinder 1. The inner surface of the cylinder structure is as highly reflective as possible. For this purpose, the parabolic cylinder 1 is preferably formed of sheet metal and internally provided with a completely reflective coating. It has been found preferable to make the parabolic cylinder 1 of aluminum of high purity, and to obtain best possible reflection by polishing the inner surface. The parabolic cylinder 1 is closed by a planar reflector 2 designed as a mirror in the same manner as the parabolic cylinder 1. The planar reflector extends symmetrically transverse to the axis of the parabolic cross-section and consequently perpendicularly to the focal line of the cylindrical parabolic surface. The body of active material to be illuminated is shaped as a planar plate 3 which fully or partially covers the reflective surface of the planar reflector 2. The light source has the shape of a rod 5 and extends coaxially with the focal line 4 of the parabolic cylinder. Preferably, the light source consists of a tubular gas discharge lamp, such as a xenon lamp, whose electric terminals 6 and 6' extend laterally out of the reflector structure.

The operation of the molecular amplifier device according to FIG. 2 can be explained as follows. Light issuing from the rod-shaped source 5 is predominantly directed by reflection from the inner surface of the parabolic cylinder 1 as a beam of parallel rays toward the planar reflector 3. These rays pass through the solid laser material 3. The light not absorbed in the first passage through the body 3 is reflected by the planar reflector 2 and penetrates a second time the optically absorbent body 3. To the extent some radiation energy is still present after the second passage through the absorbent material 3, such energy substantially corresponds to a beam of parallel rays entering into the parabolic cylinder. This beam of parallel rays is subjected to reflection in the direction toward the focal line. Thereafter, especially if the light source 5 is optically thin, the light is again deflected toward the optically absorbent material 3 and the planar mirror 2. Consequently, there is a repeated passage of the light originating from the source 5 and passing through the active material 3 as many times as is needed to consume the light energy virtually in entirety. If the light source is not ideally thin optically but of appreciable optical density, the light reflected back into the light source has the effect of additionally heating the light source. This likewise results in increasing the energy density of the light source 5. Consequently, for obtaining a given energy density in the active material, the energy to be supplied by the light source can be appreciably reduced in comparison with that required in known devices under otherwise comparable conditions. If the illuminated body 3 constitutes the active material of a laser, the secondarily stimulated laser radiation is emitted at the free narrow sides, for example at the upper and lower sides 3a or 3b, depending upon which particular side the silvering or other reflective coating usually provided has been kept semitransparent or omitted.

As a rule, rod-shaped light sources issue light not only perpendicularly to the rod axis but also laterally. It is therefore preferable to utilize such lateral light by covering the parabolic cylinder on top and bottom by respective planar mirrors having reflective surfaces facing the inner space of the parabolic cylinder. In the illustrated embodiment, the upper one of these cover reflectors is denoted by 7 and identified by parallel lines. The planar reflectors preferably consist of the same sheet metal, for example polished aluminum, as the parabolic cylinder 1 and the planar reflector 2.

It is a particular advantage of the device that the shape of the parabolic cylinder 1 need not meet exacting requirements because, relative to the illumination of the active material, the operation is not dependent upon an image-forming principle but is based upon the reflection of light in such a manner that it passes in virtually unlimited repetition through the light-absorbing material 3.

It is further not a necessary requirement of the invention that the light-absorbing material 3 be given the shape of a planar plate as shown in FIG. 1. Another way of applying the active material, for example, is to mount several rods of circular, square or rectangular cross section beside each other in front of the mirror surface of the reflector 2 within the region of illumination. This affords a considerable simplification from manufacturing viewpoints because relatively large plates having a uniform doping are difficult to produce for laser purposes.

Figure 3:
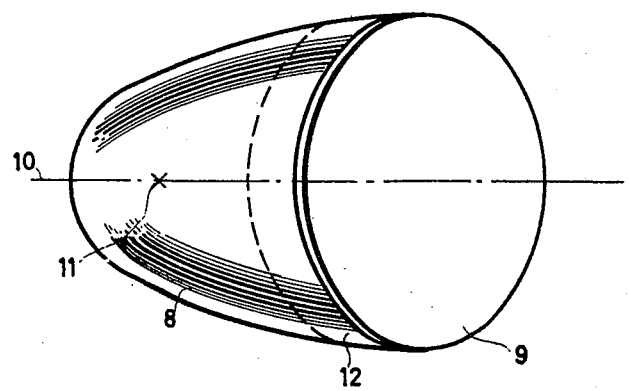
FIG. 3 shows another laser device according to the invention equipped with a paraboloid reflector system.

As shown in FIG. 3, a paraboloid-shaped reflector can be employed in lieu of the parabolic cylinder described above. According to FIG. 3, a paraboloid 8 of reflector material, such as the above-mentioned sheet-aluminum, is closed by a planar reflector 9 of circular shape which extends in coaxial and perpendicular relation to the rotational main axis 10 of the paraboloid 8. The light source is to be mounted on the paraboloid axis, namely on the focal point 11, of the paraboloid and is preferably given a spherical shape and a small size in relation to the dimensions of the reflector structure, so that the light source has in approximation the property of a point-shaped source. Well suitable for such purposes, for example, is a mercury-vapor high-pressure lamp having a spherical bulb-shaped envelope and a small electrode spacing. Another light source well suitable for such purposes is a xenon short-arc lamp having a design similar to that of the mercury-arc lamp just mentioned. The light-absorbing laser material 12 in the embodiment of FIG. 3 has the shape of a circular disc and can be given any desired thickness. When employing an optically thin (low optical density) material, the circular disc, as a rule, is given the shape of a short cylinder. The active material 12 need not necessarily extend over the entire reflecting surface of the planar reflector 9 but may cover only portions of that surface.

When employing a device according to FIG. 3 for a laser, the resulting laser output radiation is issued laterally, for example through an opening in the parabolic cylinder 8, this opening extending over the entire periphery or only over part thereof. The peripheral surface of the laser body 12 in this case may also be given a mirror coating, leaving only a selected peripheral range bare or semitransparent for issuing the stimulated monochromatic radiation through the remaining outlet.

Devices according to the invention, such as those described above, also afford a different mode of operation in which the radiating direction of the generated laser light coincides, at least approximately with the direction of the pumping light. Both types of light then differ from each other virtually only by their respectively different wave lengths. This makes it possible to provide additional reflectors that virtually reflect only the laser light, at least partially, thus supplementing the device to form a laser of the Perot-Fabry type. This can be done for example by providing on the surface of the material 3 or 12 facing the light source a reflective coating which is virtually completely permeable to the pumping light but only slightly permeable to the laser light. The reflector 2 or 9 is then to be designed in such a manner that it reflects virtually completely the pumping light but only partially the laser light. For example, when ruby is employed as light-absorbing material in a laser, the mirrors suitable for the just-mentioned purposes may consist of the so-called dielectric reflectors, having a blocking action (opaqueness) for given wave ranges when employed in layers whose thickness is equal to one-quarter wave length. It is known to produce such thin layers by vapor deposition; and it is also known that the number of such thin layers deposited upon the dielectric reflector, as well as the type of the material being used, determines the frequency ranges of the reflector in which light is permitted to pass through or is blocked.

Figure 4:
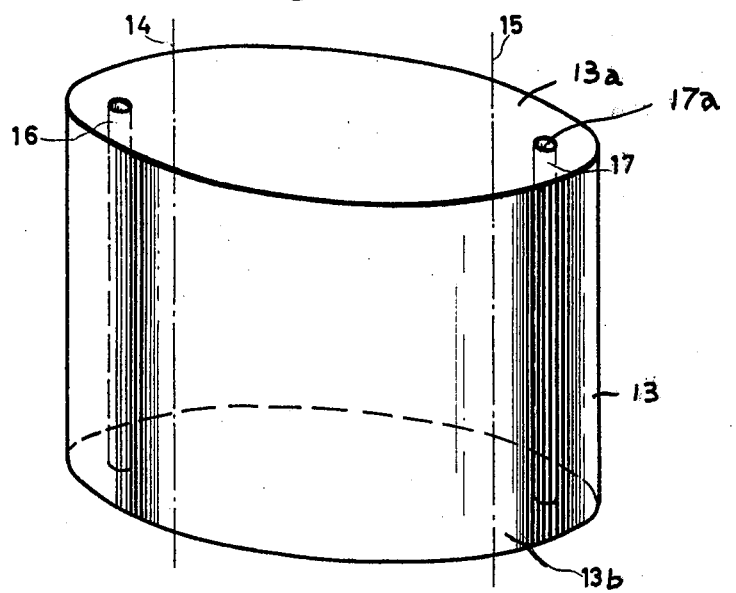
FIG. 4 shows schematically a laser system according to the invention comprising a reflector shaped as an eliptical cylinder.
Figure 5:
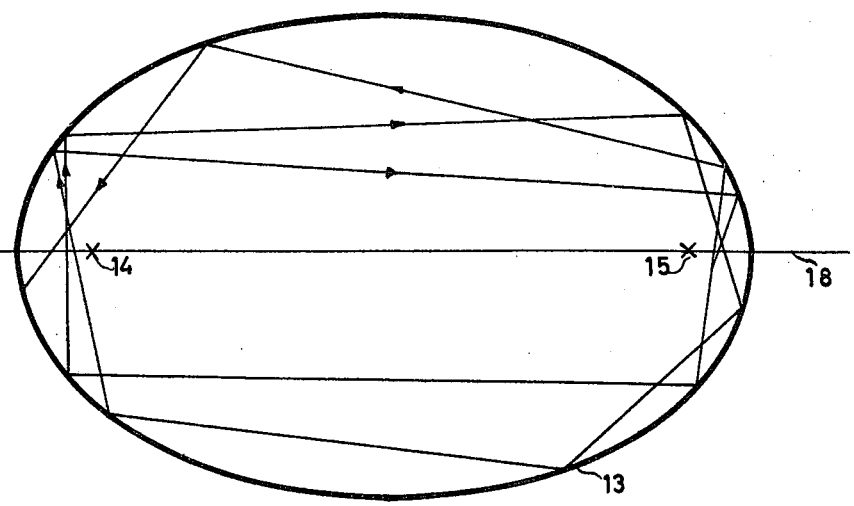
FIGS. 5 and 6 are explanatory and show elliptical cross sections with reference to devices similar to that of FIG. 4.
Figure 6:
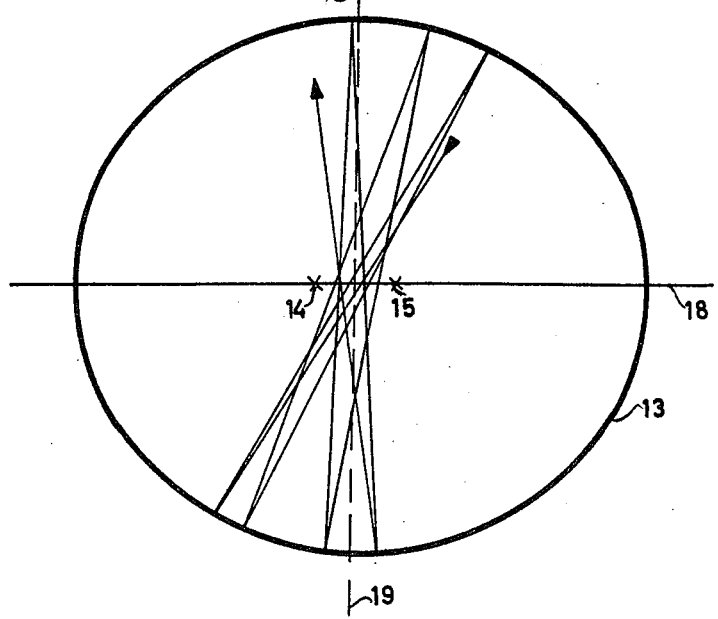

FIGS. 4, 5 and 6 show an embodiment of the invention in which the reflector system is equipped with an elliptic reflector in form of a cylinder having an elliptical cross section. The elliptical cylinder in FIG. 4 is denoted by 13. Its two focal lines are denoted by 14 and 15. Mounted between the reflector wall and the focal line 14 is a rod-shaped light source 16. Mounted between the reflector wall and the focal line 15 is a rod-shaped light-absorbing body 17 such as a ruby rod, or a gas-containing tube in the case of a gas laser. The axes of the two rods 16 and 17 are located in the plane of symmetry determined by the focal lines 14 and 15. The rod axes are at least approximately parallel to the two focal lines. When operating the device as a laser, the generated monochromatic laser light can issue from one or both end faces 17a of the ruby rod 17 for further use. While in this embodiment the light source 16 and the body of material 17 are each located symmetrically in spaces between the focal line and the next adjacent reflector area, the source 16 and the body 17 may also be arranged symmetrically in the space between the two focal lines 14 and 15.

The principle of a device as shown in FIG. 4 and described above can be understood from the following. FIG. 5 shows a horizontal section through the elliptical cylinder 13. The focal lines 14 and 15 appear as respective points on the main axis 18 which define the location of a plane of symmetry perpendicular to the plane of illustration. Assume that a light ray issues from the plane 18 in an area located between the focal line 14 and the adjacent reflector wall. This ray is never reflected into the space between the two focal lines, but always into the regions outside of the focal lines, this being true not only for single reflection but also for multiple reflections. Consequently, if the light source is mounted at the left of the focal line 14 as shown in FIG. 4, then the reflected light from this source appears in the space between the focal line 15 and the right-hand reflector surface. If in this space the light is not totally absorbed, then the non-absorbed portion of light is reflected back into the region close to the light source. If the light source does not fully absorb this reflected portion, it is again reflected back into the range of the absorbent body of active material 17.

FIG. 6 shows a modified case in which a light ray within an elliptical cylinder passes through the major axis 18 of the ellipse in the range between the focal lines 14 and 15. Such a ray cannot escape from the range between the two focal lines 14 and 15 even after any number of reflections. Consequently, if the light source is mounted in the range between the focal lines 14 and 15, and the light-absorbing active material is mounted adjacent to the source in the same region, then the light from the source 16 will repeatedly pass through the active material 17 until all of it is virtually consumed. However, it is advisable to arrange the light source and the active material in symmetrical relation to the minor axis of the ellipse. It is then also of advantage if the light source and/or the body of active material are given a rod-shaped design and have their respective axes extend parallel to the focal line. For this purpose, the cross section of the light source may be rectangular, at least approximately, and the longer side of the rectangle should be approximately parallel to the minor axis of the elliptical shape.

With reflector devices comprising an elliptical cylinder, it is also preferable to close the reflector system by planar reflectors which are spaced from each other in the direction of the cylinder axis and which terminate the elliptical cylinder space at the two ends. As a result, the so-called lateral light is additionally utilized in the same manner as mentioned above with reference to parabolically cylindrical reflectors. In FIG. 4, such planar reflectors at the top and bottom of the cylindrical reflector 13 are denoted by 13a and 13b.

Figure 7:
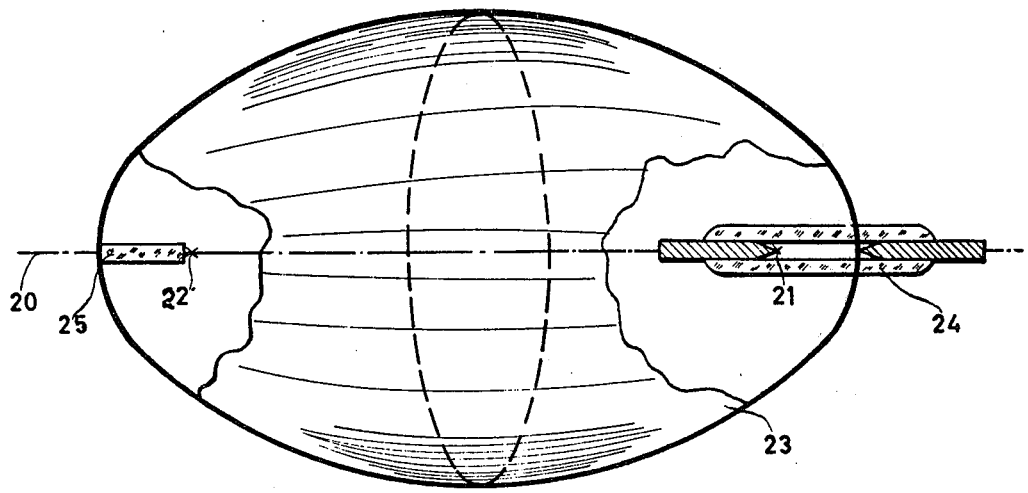
FIG. 7 shows schematically a laser device according to the invention with a reflector of ellipsoidal shape.

In the embodiment illustrated in FIG. 7, the reflector system consists essentially of a sheet metal structure in the shape of an ellipsoid. The major axis, about which the ellipsoid is rotationally symmetrical, is denoted by 20. The two focal points 21 and 22 are located on the major axis. Mounted in the direction of the major axis 20 between the wall of the ellipsoid 23 and the focal point 21 is a rod-shaped light source 24. Analogously, a rod-shaped body of light-absorbent material 25 is mounted between the focal point 22 and the opposite reflector area. Applicable to the ellipsoid with respect to reflection of light are the considerations presented above with reference to FIG. 5. That is, all of the light coming from the area of the light source 24 passes, essentially after only one reflection, through the rod 25 of active material. The light not absorbed by the rod 25 of active material is reflected back into the area of the light source 24 where it results in increasing the energy density and, depending upon the amount of absorption in the source, causes some additional heating of the source. Any residual portion is again reflected to the active material 25. In this manner, virtually all available light energy from the source 24 is supplied to the active material 25, disregarding only the reflection losses which can be kept within very slight and negligible limits. Suitable as reflector material is surface-polished aluminum of high purity, as mentioned above. The output beam from the laser can be taken in a particular convenient manner from the crystal 25 in the direction of the ellipsoid axis 20 by providing a corresponding outlet opening at this spot of the ellipsoid. Due to the extreme bunching of the laser beam, the outlet opening in the sheet-metal reflector need not be larger, as a rule, than the cross section of the laser crystal. A particular advantage of the device according to FIG. 7 resides in the fact that the primary light from the rod-shaped source 24 is substantially concentrated exclusively in the limited area between the focal point 21 and the next adjacent wall of the reflector and is radiated laterally of the major axis 20. As a result, the area between the focal points 21 and 22 on the major axis 20 is virtually without illumination. Furthermore, this type of illumination for the active material 25 provides a supply of pumping energy which is fully symmetrical with respect to the rod axis.

In devices according to FIG. 7 and in analogy to the embodiment of FIG. 7, a modification can be applied by mounting the light source 24 and the body of active material 25 between the focal points 21 and 22 on the major axis 20. In this case, too, an increased efficiency is attained. The rod of material and the light source are preferably given a circular cross section.

By choice of the eccentricity of the ellipse in devices according to FIGS. 4, 5, 6 and 7, the light source together with the body of active material may be made to nearly fully occupy the space on the reflector axis between the focal lines or focal points or, as the case may be, between each focal locus and the adjacent point of the reflector wall. This permits giving the light source and the active body approximately equal external dimensions.

For simplifying the manufacture, the ellipse can be given a rather slight eccentricity. The elliptically cylindrical reflector then approaches a circular cross section and the ellipsoid approaches spherical shape. From a mathematical viewpoint, this change from an ellipse to a circle or from an ellipsoid to a sphere, corresponds to compressing the focal loci until in the limit case these loci cover each other. With such approximately circular cylinders or approximate spheres, the light source and the body of active material are arranged opposite each other, preferably so that they, at least approximately, cover each other completely in a common plane through the center.

Relative to the provision of a reflecting surface, such as by silvering, on the light-absorbing active material, and the use of particular types of light-absorbing material, the means and expedients described with reference to FIGS. 2 and 3 are analogously applicable to the embodiments according to FIGS. 4 to 7.

Figure 8:
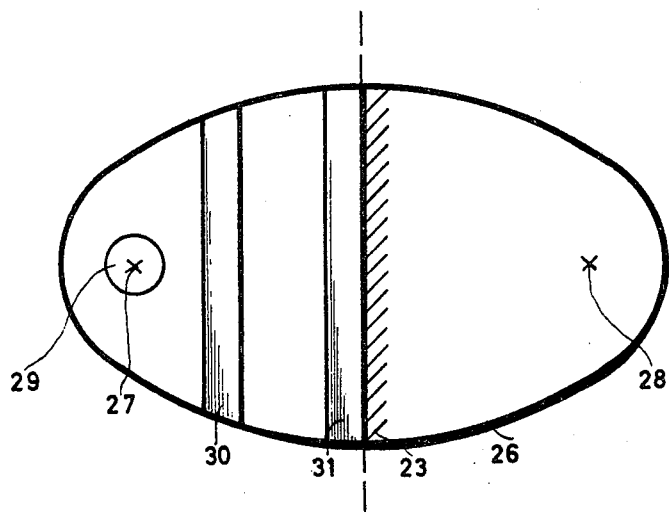
FIG. 8 shows schematically a modified form of an elliptical or ellipsoidal reflector system according to the invention.

In the embodiment schematically illustrated in FIG. 8, an elliptically cylindrical reflector 26, having focal lines at 27 and 28, is provided with a rod-shaped source of light 29 whose axis is coincident with the focal line 27. The body 30 of active material extends transverse through the reflector space so that it partitions the space between the focal lines 27 and 28. For this purpose, the plate-shaped body 30 extends through the entire width of the elliptical cylinder 26. All of the light issuing from the source 29 thus passes through the active material once or several times. The portion of the elliptical space that comprises the focal line 28 can be omitted, and the plate of active material can then be covered on the outside by a reflector 23 which is completely reflective at least for the pumping light. This modification, resembling that of FIG. 3, is particularly advantageous if the plate-shaped body of material is located in symmetrical relation to the area of the elliptical shape as is shown for the body 31 (the body 30 being then omitted and the reflector portion 26 at the right of the reflector 23 being then unnecessary). A device of this type can also be modified by mounting the light source outside of the focus on the main axis in analogy to the corresponding embodiments described above. Also applicable in such a modification is a reflector system in form of an ellipsoid in lieu of an elliptical cylinder. If desired, a partitioning plate-shaped body of active material can also be provided together with two light sources which are mounted on the two focal lines or outside of these two focal lines in the respective two half-portions of the elliptical reflector.

The reflector systems illustrated in the abovedescribed embodiments are preferably subdivided, particularly along a plane of symmetry, the two half-portions being removably fastened together to make the interior accessible.

While the invention has been described predominantly with reference to active materials consisting of crystal rods, it is applicable in the same manner to tubular or other bodies containing gaseous maser or laser materials such as helium or neon.

To those skilled in the art, it will be obvious upon a study of this disclosure that my invention permits of various other modifications and can be given embodiments different from those described and illustrated herein, without departing from the essential features of my invention and within the scope of the claims annexed hereto.

I claim:

1. A molecular amplifier comprising a body of optically stimulatable material, a source of pumping light, a reflector device for concentrating the pumping light onto said body, said device having an open hollow mirror of a non-circular cross-section defining a main axis and a focal locus spaced on said axis inwardly from the opening of the mirror, said source being situated in the hollow of said mirror near said focal locus, said body being situated at a plane axially spaced from said focal locus and extending substantially perpendicularly to said axis and comprising a planar plate sealing the opening of the hollow mirror and reflecting on its outside surface, said light source and said body being in positions at which substantially all available light energy from said light source is supplied to said body, and said device having a planar mirror covering the opening of said hollow mirror and extending substantially in a plane perpendicular to said axis, and output means coupled to said body for deriving energy therefrom.

* * * * *